(12) United States Patent
Ko et al.

(10) Patent No.: US 6,577,674 B1
(45) Date of Patent: Jun. 10, 2003

(54) CHANNEL COMPENSATOR FOR DS-CDMA RECEIVER

(75) Inventors: Seok-Jun Ko, Konggi-do (KR); Kyung-Ha Lee, Seoul (KR); Hyung-Jin Choi, Seoul (KR)

(73) Assignee: Samsung Electronics Co, Ltd., Suwon (JP)

( * ) Notice: Subject to any disclaimer, the term of this patent is extended or adjusted under 35 U.S.C. 154(b) by 0 days.

(21) Appl. No.: 09/390,117

(22) Filed: Sep. 3, 1999

(30) Foreign Application Priority Data

Sep. 3, 1998 (KR) ........................................ 1998-36248

(51) Int. Cl.[7] .......................... H04B 15/00; H04K 1/00; H04L 27/30
(52) U.S. Cl. ........................ 375/148; 375/346; 370/342
(58) Field of Search ................................ 375/130, 140, 375/147, 148, 346, 348, 340, 285, 144; 370/335, 342

(56) References Cited

U.S. PATENT DOCUMENTS 4,291,410 A * 9/1981 Caples et al. ................ 375/345
5,353,301 A * 10/1994 Mitzlaff ....................... 375/152

* cited by examiner

Primary Examiner—Jean Corrielus
(74) Attorney, Agent, or Firm—Cha & Reiter (57) ABSTRACT

A channel compensator for estimating and for compensating a phase change and a residual frequency offset of a despreaded signal, prior to synchronous demodulation in a DS-CDMA receiver. In the channel compensator, a first integrator accumulates input signals sampled at a given chip rate for a predetermined period and multiplies the accumulated value by a given gain. A shift register having a plurality of registers shifts the data output from the first integrator. A second integrator integrates the data generated at once from the respective registers of the shift register. A delay means delays the input signal for a predetermined time, and a multiplier multiplies the delayed input signal by an output of the second integrator in order to generate the compensated signal. The delay device delays the input signal by a time required for the input signal to reach a central register of the shift register through the first integrator. The second integrator includes a summer means for summing the values of the respective registers of the shift register at an update period of the first integrator, and a multiplier for multiplying a value output from the summer means by a reciprocal number of the number of the registers to reduce the dispersion of an estimation value due to noises, and for adjusting a bit value for detected information.

9 Claims, 8 Drawing Sheets

CHANNEL COMPENSATOR FOR DS-CDMA RECEIVER

CLAIM OF PRIORITY

This application makes reference to, incorporates the same herein, and claims all benefits accruing under 35 U.S.C. §119 arising from an application entitled, CHANNEL COMPENSATOR FOR DS-CDMA RECEIVER, earlier filed in the Korean Industrial Property Office on Sep. 3, 1998, and there duly assigned Serial No. 1998-36248.

BACKGROUND OF THE INVENTION

1. Field of the Invention

The present invention relates to mobile communication systems which employ direct sequence-code division multiple access (DS-CDMA) for facilitating coherent communication reception, and in particular to a channel compensator for estimating and compensating for phase changes and residual frequency offsets of despreaded signals prior to synchronous demodulation.

2. Description of the Related Art

In a wireless communication system, a communication signal is received through several independent paths. A receiver element receives multiple versions of the transmitted signals that have propagated along different paths. However, the strength of received signals may vary due to complex addition of multipath signals known as fading. Among the technique used to mitigate the effects of fading in DS-CDMA communication system is the space diversity technique. Space diversity reception methods can be classified into four categories; 1)selection diversity; 2)feedback diversity; 3)maximal ratio combining, and 4)equal gain combiner. Depending on the type of methods utilized, the performance of the system varies.

The diversity technique used in an IS-95 DS-CDMA system often uses a RAKE receiver employing a Maximal Ratio Combining (MRC), which is considered to be most superior in the performance by enabling received signals to better withstand the effects of various channel impairments. The RAKE receiver, which is well known in art, employs synchronous demodulation to provide an improvement in the communication link between a transmitter and a receiver by recreating more accurately the informational content of the communication signal actually formed at the transmitter, through time diversity technique. Two-phase or binary Phase Shift Keying (PSK) is the most suitable modulation scheme because of its high power efficiency at high bit error rates (BERs). In order to make high quality synchronous demodulation of PSK possible, it is desirable to compensate for phase information such as a Rayleigh fading's phase change, and for frequency offsets from the transmitter/receiver clock not being perfectly locked due to inaccuracies in the local oscillator. Thus, any means to improve the quality of the channel estimate would therefore be beneficial to facilitate better recreation at the receiver of a signal transmitted thereto.

A synchronous DS-CDMA system uses an average value of a received signal, to compensate for phase shifts and different amplitude attenuations due to fading in a radio mobile channel. However, the average value of a particular sample duration is not adopted to compensate for any variation in channel environment or channel characteristics which may affect the information signal communicated from a transmitter to a receiver.

A Maximum Likelihood (ML) algorithm can be used to observe frequency offsets during the time-varying phase frequency period. The ML algorithm using the average value of the received signal typically includes a joint estimation of an attenuation vector $\alpha$ and a phase vector $\theta$. From the maximized conditional probability density function $p(\rho|\alpha, \theta, T_p)$ for a particular observation $\rho$ of the received signal vector $r_{\_k} = (r_{\_k,l}, \ldots, rk, L)^T$, the following is obtained:

$$\overline{\alpha_l}\cos(\overline{\theta_l}) = \frac{1}{N_p}\sum_{n=0}^{N_p-1} \text{Re}\{r_{k,l}[n]\} \quad (1)$$

$$\overline{\alpha_l}\sin(\overline{\theta_l}) = \frac{1}{N_p}\sum_{n=0}^{N_p-1} \text{Im}\{r_{k,l}[n]\} \quad (2)$$

where $N_p$ is an observation length in channel estimation.

By using equations (1) and (2), the receiver can obtain the residual frequency offsets generated by the channel at a particular sample duration indicative of the time-varying phase and frequency.

The following discussion of various figures give some background as to system and methods involved to a rake receiver scheme for receiving signals through a multipath environment.

Figure 1:
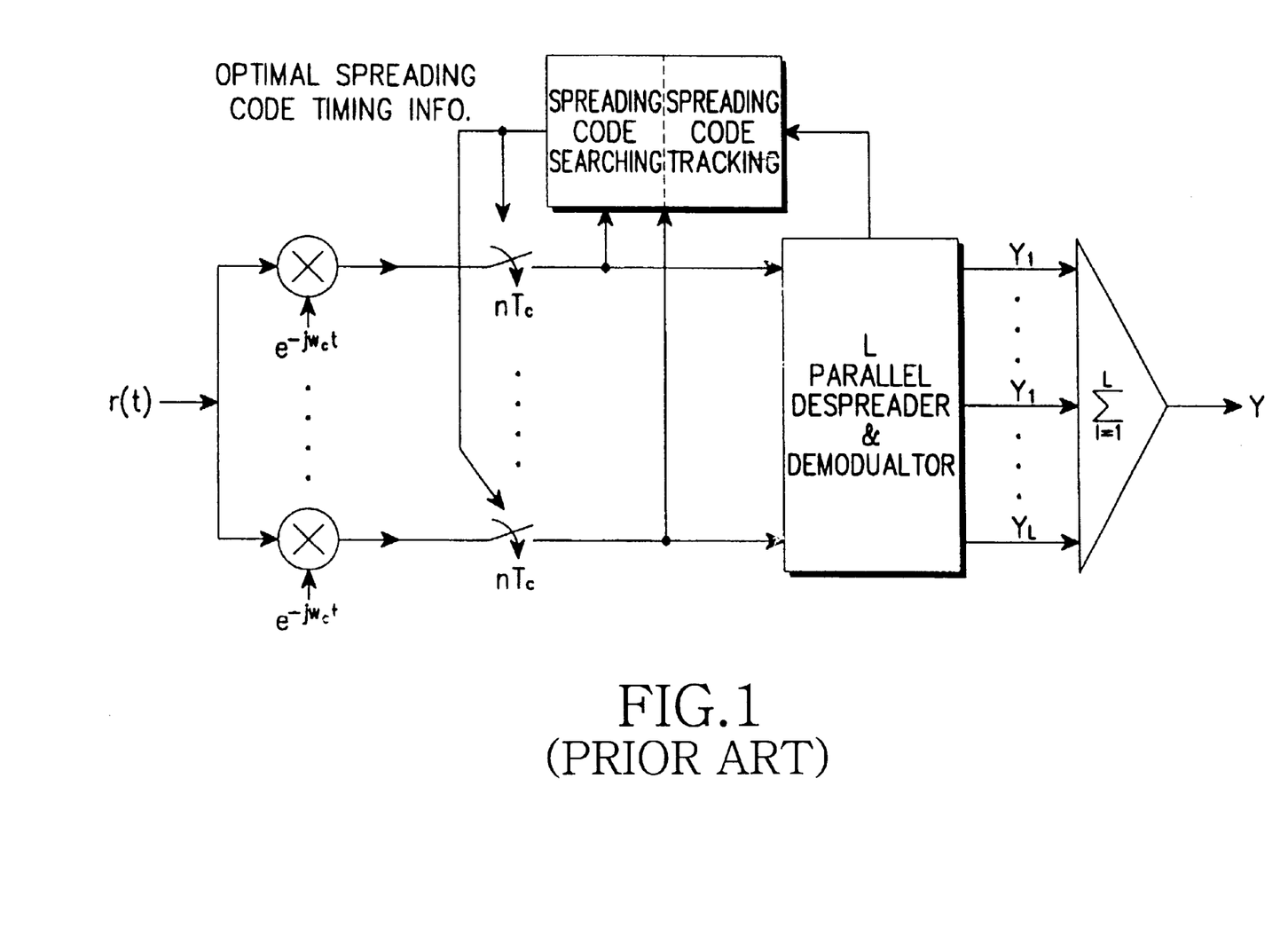
FIG. 1 is a diagram illustrating a conventional receiver in a mobile station.

FIG. 1 illustrates a structure of a common known receiver in a mobile station. It will be appreciated by those skilled in the art that several different receivers exists which can be used to retrieve transmitted signal from the communication channel. In FIG. 1, an input signal, which is down converted to a baseband signal by a local oscillator, is sampled at a particular chip rate, and a searcher is used to look for alternate multipaths and for neighboring base station signals to find a strong correlation with the assigned code. Once a strong signal is located at a particular time offset, the searcher assigns a receiver element to demodulate that signal. The input signals from L multipath are combined with a diversity combiner for preventing a performance degradation due to the multipath fading.

Figure 2:
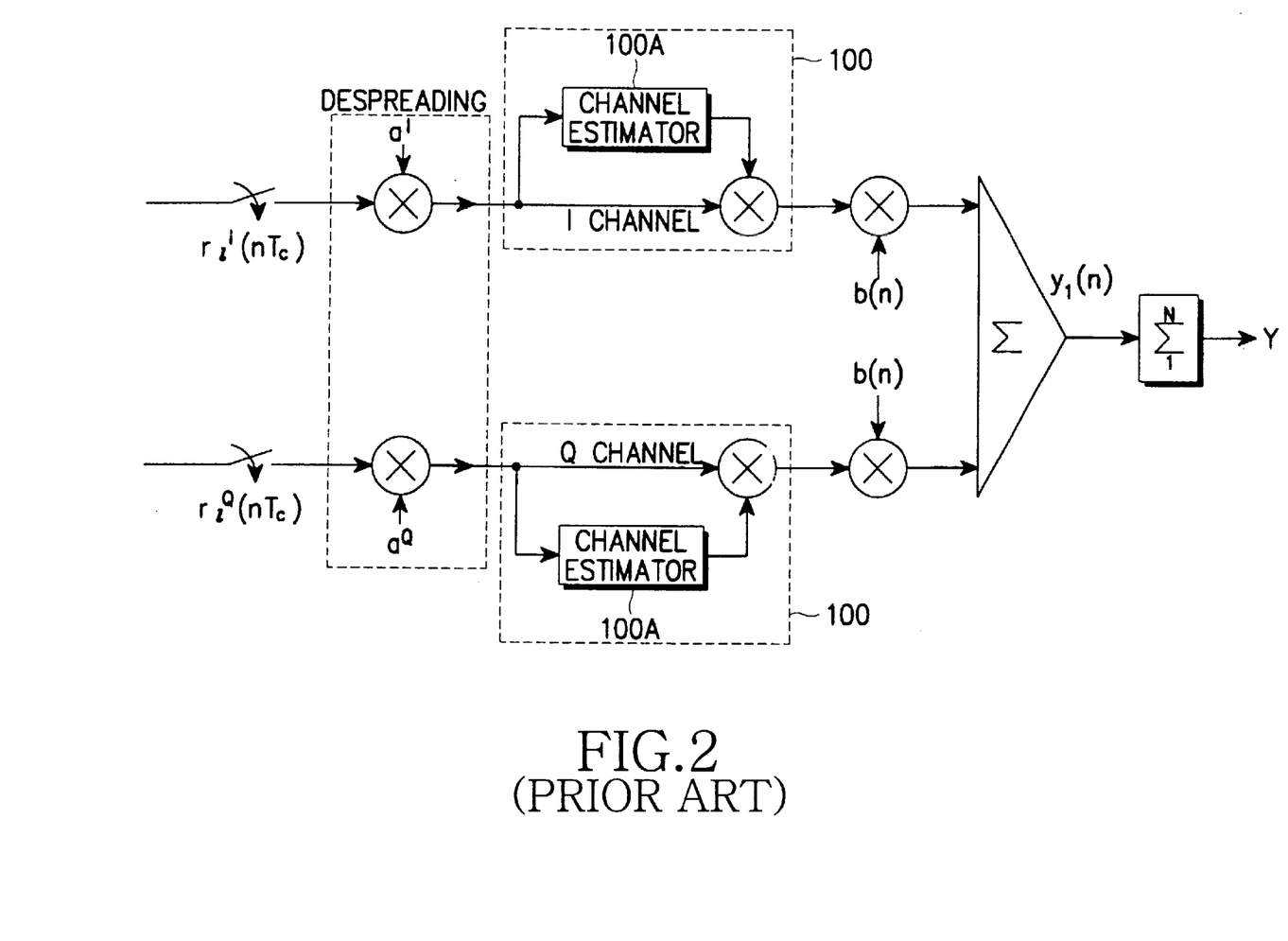
FIG. 2 is a diagram illustrating a finger structure of a mobile station for a particular path l.

FIG. 2 illustrates a structure of the finger of a conventional mobile station for a particular path l mentioned in the above. A pair of PN sequences are generated by I-channel PN generator and Q-channel PN generator. In FIG. 2, the sampled signals are despread by local PN (Pseudo Noise) codes $a^I$ and $a^Q$ so that the phase change and the residual frequency offset of the despread signals are compensated by channel compensators 100. Thereafter, by multiplying the channel compensated signals by a Walsh code b(n), wherein the spreading codes are orthogonal to each other, the received signal can be correlated with a particular user spreading code such that it would possible to acquire only a desired logical channel or user signal related to the particular spread code, such as a sync channel, a paging channel, and a traffic channel by correlating the received signals. At the next stage, an integrator for integration of the multipath correlation component over a predefined interval of time converts the signals in the chip unit to the signals in the bit unit in order to obtain a processing gain by the PN code. The ratio of the spread data rate to the initial data rate is called the processing gain. The correlator use the processing gain to recover the desired signal and reject the interference. It will be appreciated by those skilled in the art that the integrator function may be implemented with a data sample summing circuit and multiplier.

Figure 3:
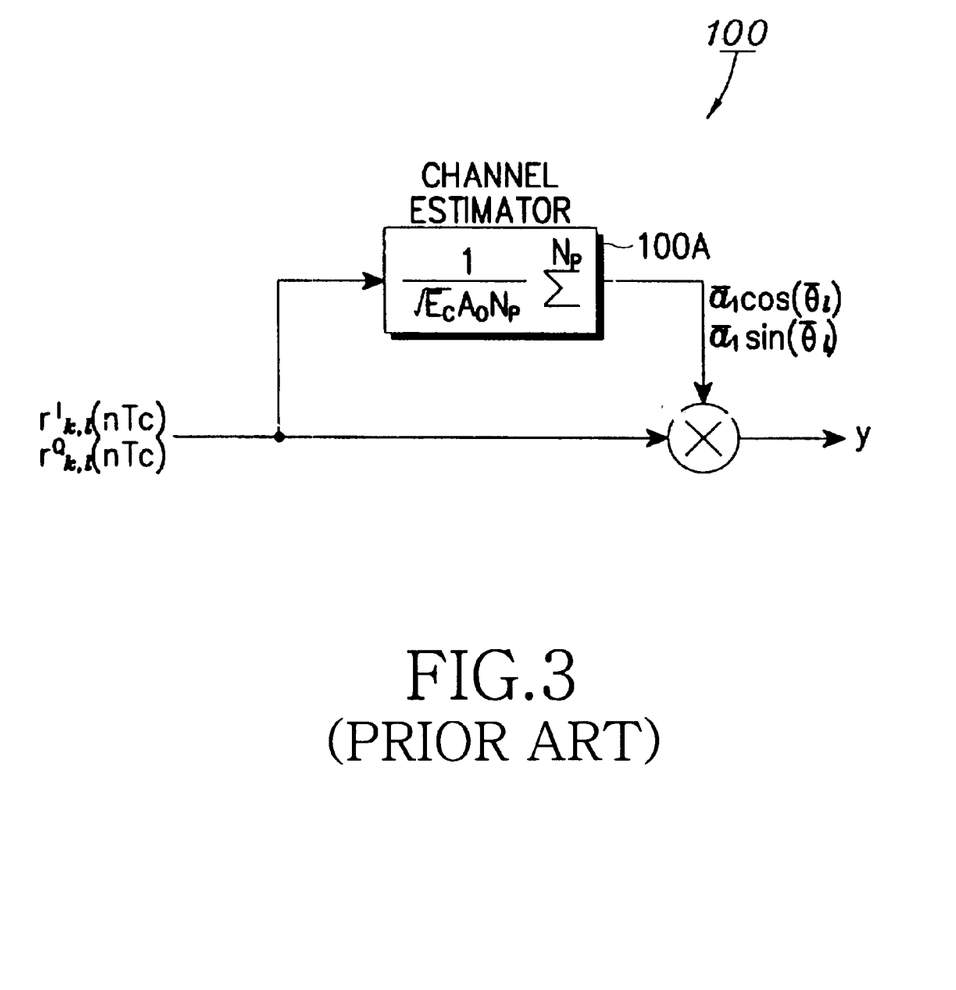
FIG. 3 is a diagram illustrating a structure of a conventional channel compensator.
Figure 4:
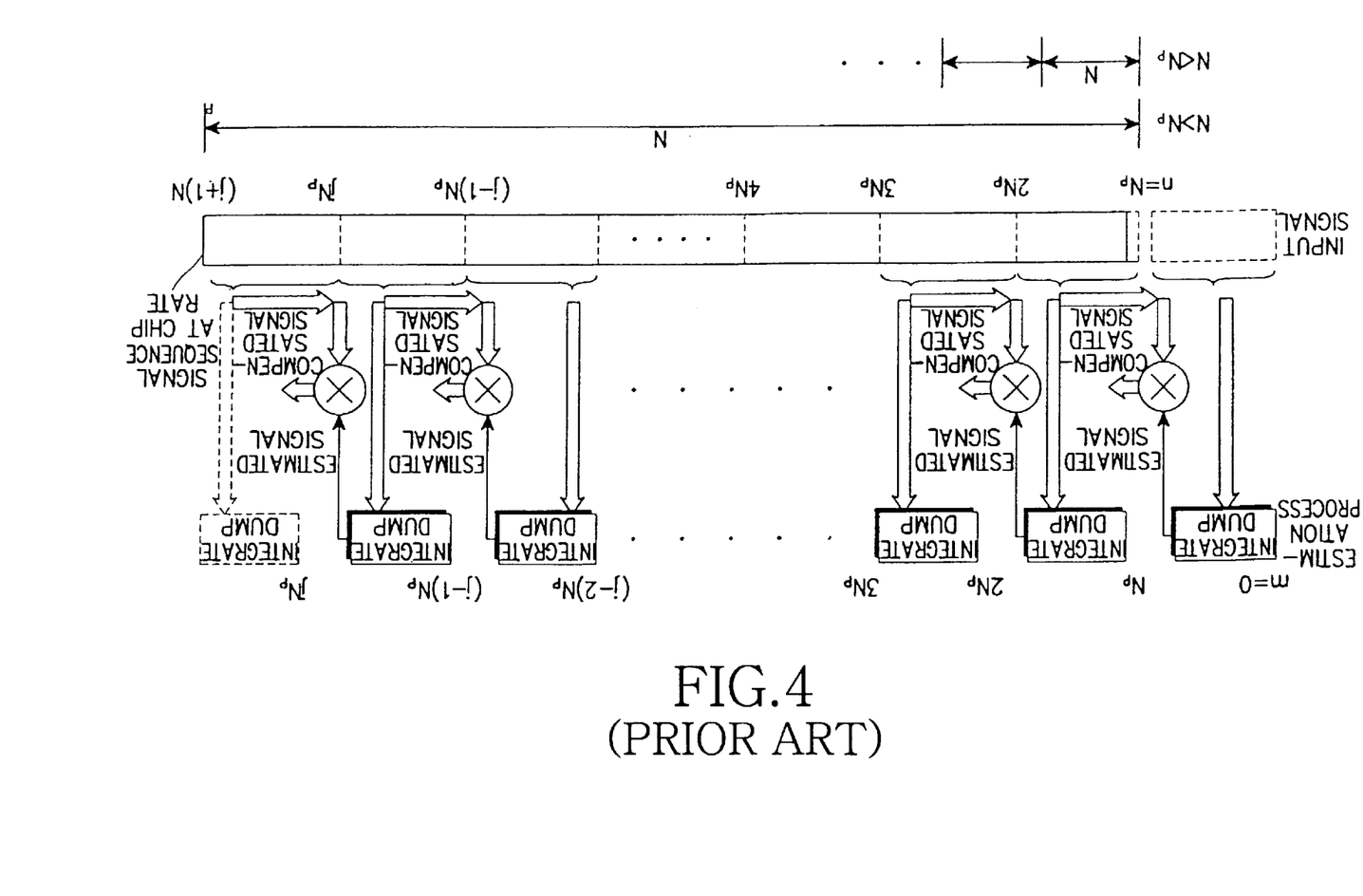
FIG. 4 is a diagram illustrating a compensation procedure implemented by the conventional channel compensators.

FIG. 3 illustrates a structure of a conventional channel compensator 100 incorporating the ML algorithm for performing the channel compensation based on an integration value for a predefined interval of time. FIG. 4 illustrates the compensation procedure by the conventional channel compensators, in which N denotes the number of chips per bit, and $N_p$ denotes observation duration which corresponds to elapsed time for updating the estimation value (*phase and amplitude) to a total observation duration.

Figure 5:
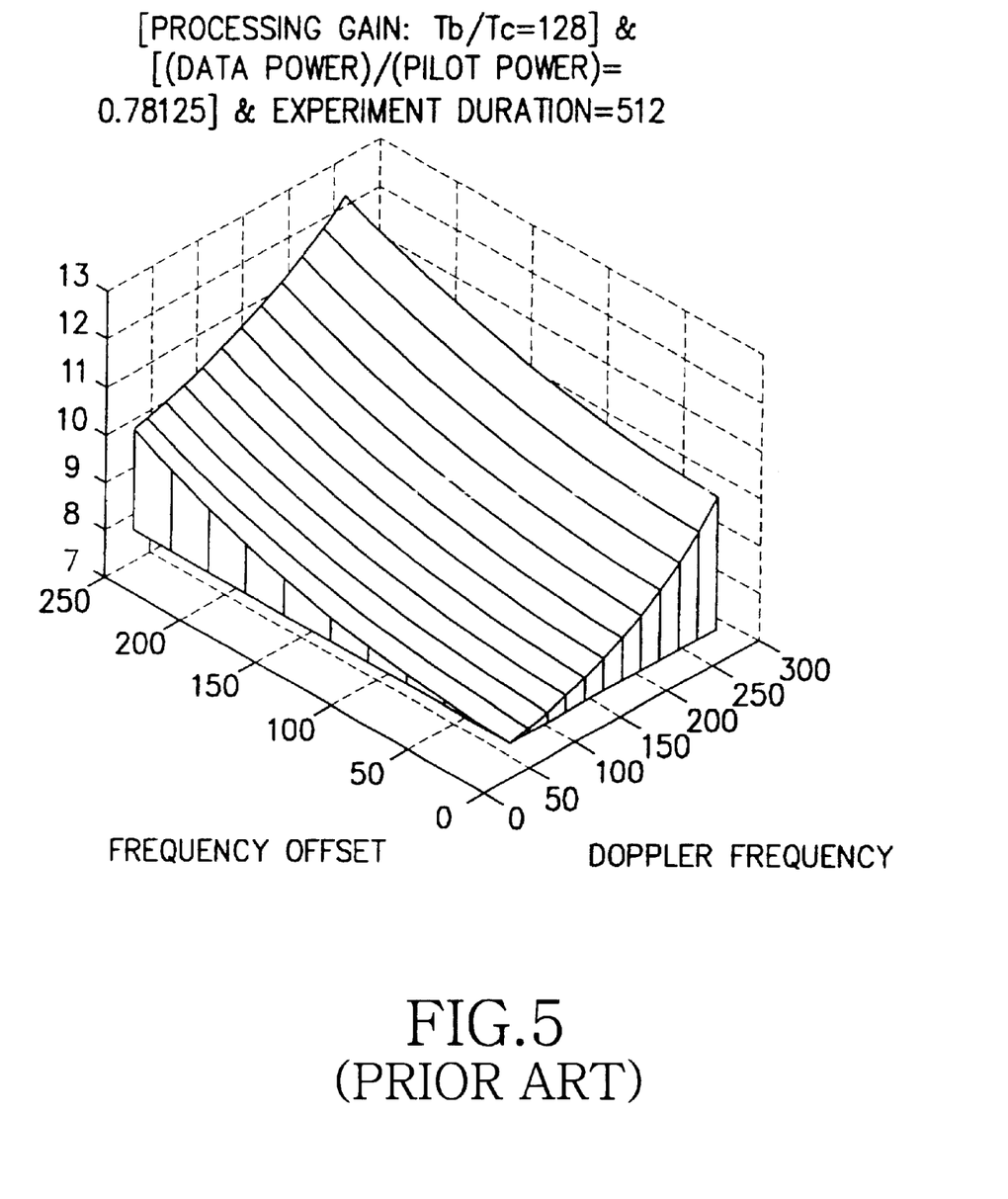
FIG. 5 is a diagram illustrating a BER performance according to a frequency offset and a Doppler frequency when a single integrator structure is used for channel estimation.

FIG. 5 illustrates a graph showing a total Eb/Io for 2% error, frequency offsets, and Doppler frequency for a single integrator structure, when Np=512 and 3 paths are provided. Here, Eb denotes an energy of one bit, and Io denotes for all the signals that the mobile station has received through its antenna. As illustrated in the graph, when the frequency offset and the Doppler frequency are both high, the Eb/Io value is also very high for providing a required performance by the receiver. However, when the signal power is low, the Eb/Io value becomes smaller.

As illustrated in the above, a rake receiver uses a channel estimator for preventing the phase change and frequency offsets. The channel estimator includes a single integrator structure and uses the ML algorithm to obtain the time-varying phase information by measuring an average value for a particular duration of sampling data. Although the channel estimator with a single integrator structure has both the noise suppression capability and the channel estimation capability, these two capabilities are independent to each other, and thereby it is not the optimal means to provide a coherent communication reception. That is, if $N_p$ is to be great, the noise suppression capability is improved, but the channel estimation capability is deteriorated. In contrast, if the $N_p$ is to be small, the channel estimation is improved, and the noise suppression capability is deteriorated.

Therefore, it is necessary to provide a different scheme of observation duration to achieve higher optimal system performance. That is, the conventional channel estimator with the single integrator is susceptible to the channel environment change, resulting in a serious performance degradation due to an abrupt channel change cause by variations in multipath characteristics. Arguably, an optimal observation duration can be set for a particular channel environment using a single integrator; however, it is still impossible to avoid the performance degradation since the channel environment is variously changing in time and space.

SUMMARY OF THE INVENTION

It is therefore an object of the present invention to provide a channel compensator for estimating and compensating for a phase change and a residual frequency offset prior to decoding so that a DS-CDMA receiver may be less susceptible to variation of multipath characteristics due to unpredictable changes in the channel environment.

To achieve the above object, there is provided a channel compensator for compensating for a phase change and a residual frequency offset of a despreaded signal prior to synchronous demodulation in a DS-CDMA (Direct Sequence-Code Division Multiple Access) receiver. The channel compensator includes a first integrator for accumulating input signals sampled at a given chip rate for a predetermined period, $N_{p1}$; a shift register including a plurality of registers for shifting the data output from the first integrator; a second integrator for integrating the data generated from the respective registers of the shift register; a delay means for delaying the input signal so that the input signal reaches a central register of the shift register; and, a multiplier for multiplying the delayed input signal with the output from the second integrator.

The delay means delays the input signal by a time required for the input signal accumulated in the first integrator to reach the central register portion of the shift register through the first integrator. The second integrator includes a summer for adding the values of the respective registers of the shift register at update period in relation to the first integrator, and a multiplier for multiplying the output value from the summer by a reciprocal number indicative of the number of the registers in order to reduce the dispersion of an estimation value to noises, and also to adjust the bit value for the detected information from the shift register.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 6:
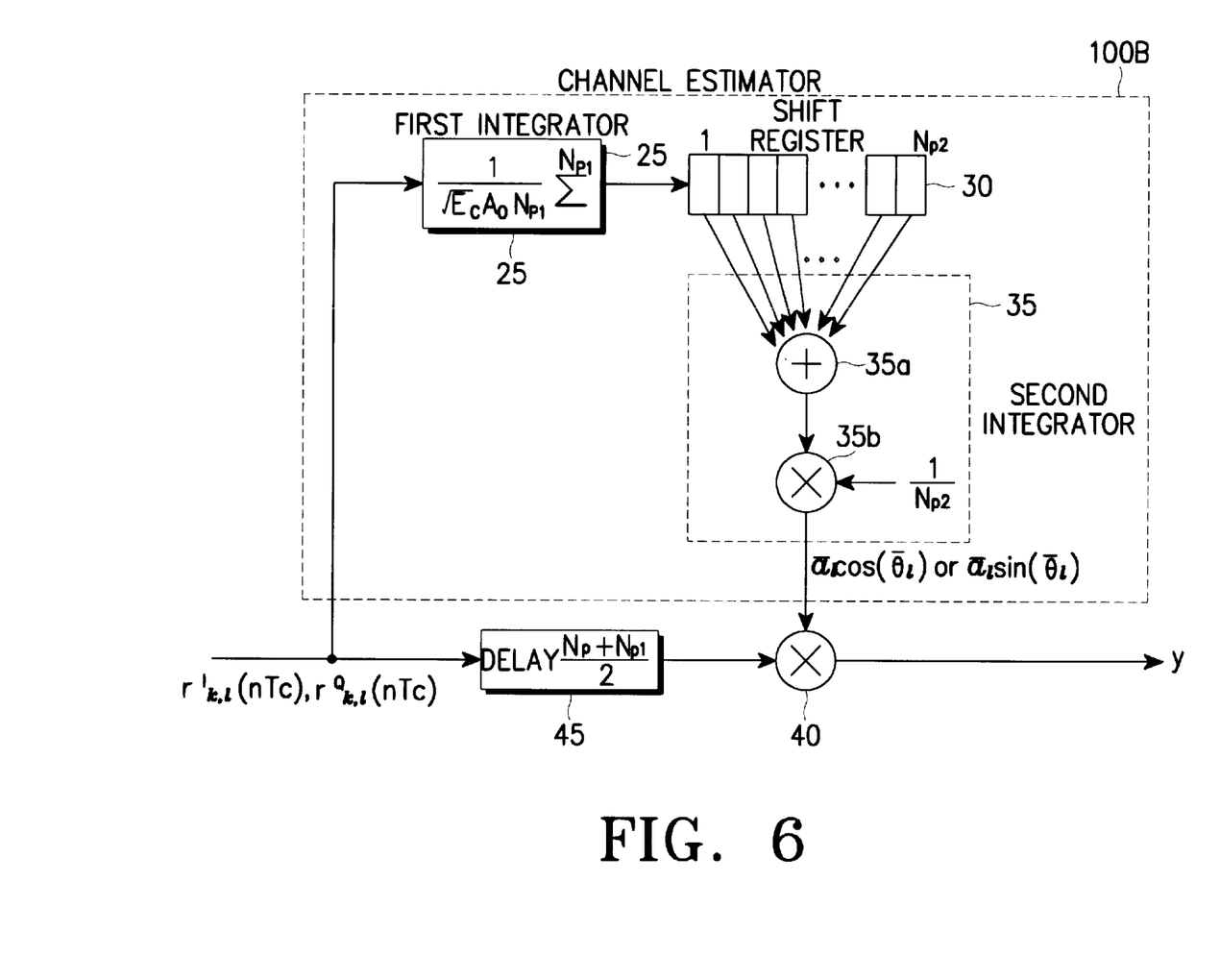
FIG. 6 is a diagram illustrating a channel compensator according to an embodiment of the present invention.

Referring to FIG. 6, a channel compensator according to an embodiment of the present invention includes a channel estimator 100B with a first integrator 25, a second integrator 35, a shift register 30, a delay 45, and a multiplier 40.

The first integrator 25 accumulates input signals sampled at a particular chip rate for a predefined interval of time, and multiplies the accumulated value by a gain $1/(\sqrt{E_c}A_oN_{p1})$ for as many as $N_{p1}$, wherein $N_{p1}$ represents the total number of the chips accumulated in the first integrator 25. The first integrator 25 has a relative short integrating duration compared to with the integrator in a conventional channel estimator incorporating a single integrator structure. If a total estimation value is set to $N_p$, the time elapsed for updating the estimation value in according to the present invention is set no lower than $1/N_{p2}$, wherein $N_{p2}$ represents the number of shift registers. Further, $N_p$ is a chip rate and can be varied base on the BER. In the conventional art, the time elapsed for updating the estimation value was set at $N_p/N_{p2}$ ($N_p=N_{p1}\times N_{p2}$, $N_{p1}=N_p/N_{p2}$). For an IS-95 system, the integrating duration is 64 chips for one Walsh code cycle.

The shift register 30 includes number of shift registers, $N_{p2}$, for shifting the value output from the first integrator 25. Thereafter, the second integrator 35 integrates the integration values from the shift register 30. As illustrated, the second integrator 35 includes a summer 35a and a gain multiplier 35b. The summer 35a adds the values stored in respective registers of the shift register 30 at a regular interval. The summer 35a accumulates the integration values output from the first integrator 25. As the more number of the registers in the shift register 30 are readily available, the output values of the first integrator 25 are easily stored in a great number, thus yielding a better performance. The gain multiplier 35b multiplies the output value from the summer 35a by a reciprocal number $1/N_{p2}$, wherein $N_{p2}$ represents the number of the registers constituting the shift register 30. By doing so, it is possible not only to reduce dispersion of an estimation value output from the channel estimator 100B caused by the noise, but also possibly to adjust the bit value for the detected information from the shift register. The estimation value output from the second integrator 35 is updated at periods of $N_{p1}$, which is relatively shorter integration duration in comparison to the integration duration in the prior known method, so that the channel estimator 100B is more adaptive to the channel environment changes. That is, a shorter integration duration indicating a shorter sampling duration can accommodate better for multi path channel characteristics and can better facilitate the accurate recreation of the informational content of the signal transmitted to the receiver. The whole estimation duration, $N_p$, has to be just long enough to obtain such an updated period, $1/N_{p1}$.

The delay 45 delays the input signal by a time duration of $(N_p+N_{p1})/2$ so that the input signal reaches a central register portion of the shift register 30 after passing through the first integrator 25. This is done because the value at this particular moment is considered to be most stable. Here, $N_p=N_{p1}\times N_{p2}$, wherein $N_{p1}$ represents the total number of the chips accumulated in the first integrator 25. The first integrator 25 should generate the integration value as many times as the number of the registers, $N_{p2}$, of the shift register 30 for providing the integration values to all the registers. In addition, the value of $(N_p+N_{p1})$ is divided by 2 in order to determine the time when the input signal reaches the central register portion, i.e., the fourth register, in case where the shift register 30 consists of 7 registers. Thus, it is preferable that the number of the registers, $N_{p2}$, should be an odd number. The multiplier 40 multiplies the time-delayed input signal from the delay 45 by the output value from the second integrator 35 to provide a compensated output signal.

Now, reference will be made to the channel compensation procedure according to the present invention.

The input signals sampled at the particular chip rate are accumulated as many as $N_{p1}$ by the first integrator 25 of the channel estimator 100B, and then multiplied by the gain of $1/(\sqrt{E_c}A_o N_{p1})$. After, the first integrator 25 outputs the integrated values, the shift register 30 then shifts right these values received from the first integrator 25, at the period $N_{p1}$. The values of the shift register 30 are delivered to the summer 35a of the second integrator 35 at the same update period duration as in the first integrator 25, and the output of the summer 35a is multiplied by the reciprocal number $1/N_{p2}$, wherein $N_{p2}$ represents a number of the registers constituting the shift register 30. In this manner, the phase and amplitude information about the input signal can be obtained without being affected by the channel environment changes. That is, by increasing $N_p$ ($N_{p1}\times N_{p2}$) against the low Eb/Io and raising estimation speed against the fast changing channel variation, $N_{p1}$ is maintained at a low value to obtain better reception regardless of the channel environment.

However, to formulate the operation of the channel estimator, it is first necessary to formulate the despreading process performed at the initial stage prior to estimation process. That is, assuming that a searcher and an estimator operate ideally with respect to the PN code, the sample value of the received signal is given by $$r(nT_c) = \sqrt{E_{c,t}} \sum_{l=1}^{L} a_l(nT_c)[(A_o + x_l(nT_c)b_l(nT_c)) \cdot \cos(\Delta\omega nT_c + \theta_l(nT_c)) - jx_l(nT_c)b_l(nT_c) \cdot \sin(\Delta\omega nT_c + \theta_l(nT_c))] + n(nT_c) \quad (3)$$

where, $\sqrt{E_{c,l}}$: chip energy

L: the number of fingers in the RAKE receiver $T_c$: chip rate $A_o$: signal gain of a pilot signal $x(nT_c)$: input data $b(nT_c)$: n-th value at a particular orthogonal code $a(nT_c)$: time-varying amplitude by a mobile radio channel $\theta(nT_c)$: time-varying phase by a mobile radio channel $\Delta\omega$: residual frequency offset of the carrier $n(nT_c)$: noise In order for a finger, which represents a demodulator for a particular path, to obtain estimation values of an I (In-phase) channel term and a Q (Quadrature) channel term for BPSK (Bi-Phase Shift Keying) modulated transmission signal, it is necessary to perform a primary integration and a secondary integration as represented in the following equations. First, for the BPSK modulated transmission signal, the integrated values of the first integrator 25 are as follow:

$$\text{I Channel: } \frac{1}{A_o N_{pl}} \sum_{n=1}^{N_{pl}} [a_l(nT_c)(A_o + x_l(nT_c)b_l(nT_c)) \cos(\Delta\omega nT_c + \theta_l(nT_c)) + n^I(nT_c)] \quad (4)$$

$$\text{Q Channel: } \frac{1}{A_o N_{pl}} \sum_{n=1}^{N_{pl}} [a_l(nT_c)(A_o + x_l(nT_c)b_l(nT_c)) \sin(\Delta\omega nT_c + \theta_l(nT_c)) + n^Q(nT_c)] \quad (5)$$

The values of equations (4) and (5) are delivered to the shift register 30 at the period $N_{p1}$.

Second, the estimation values output from the second integrator 35 are as follow:

$$\text{I Channel: } \frac{1}{A_o N_{pl} N_{p2}} \sum_{k=0}^{N_{p2}-1} \left[ \sum_{n=kN_{pl}}^{(k+1)N_{pl}} \{a_l(nT_c)(A_o + x_l(nT_c)b_l(nT_c)) \cos(\Delta\omega nT_c + \theta_l(nT_c)) + n^I(nT_c)\} \right] \quad (6)$$

-continued $$\text{Q Channel: } \frac{1}{A_o N_{pI} N_{p2}} \sum_{k=0}^{N_{p2}-1} \left[ \sum_{n=kN_{pI}}^{(k+1)N_{pI}} \{a_l(nT_c)(A_o + x_l(nT_c)b_l(nT_c)) \right. \quad (7)$$

$$\sin(\Delta\omega nT_c + \theta_l(nT_c)) + n^Q(nT_c)\}]$$

The estimation values obtained from equations (6) and (7) can have the same noise suppression capability, as compared to a single integrator structure of FIG. 3, since the total accumulation number ($N_p = N_{p1} \times N_{p2}$) by the first and the second integrators 25 and 35 of FIG. 5 is identical to the accumulation number $N_p$ of the single integrator 100A in FIG. 3.

In FIG. 3, the update period for the finally obtained estimation value is $N_p$, which is relatively long, so that there is a great difference between the estimation value and the actual input value. However, when the double integrators are used as shown in FIG. 6, the overall update period depends on the update period of the first integrator 25 so that the varying channel influence or time varying amplitude and phases may be quickly estimated, in comparison to the prior art as shown in FIG. 3. By multiplying the estimation values by the time-delayed input signal using the multiplier 40, the input signal is compensated as represented by $$\text{I Channel: } \sqrt{E_{c,l}}\, a_l\left(\frac{N_p + N_{pI}}{2}\right)\left(A_o + x_l\left(\frac{N_p + N_{pI}}{2}\right)b_l\left(\frac{N_p + N_{pI}}{2}\right)\right) \quad (8)$$

$$\cos\left(\frac{\Delta\omega(N_p + N_{pI})}{2} + \theta_l\left(\frac{N_p + N_{pI}}{2}\right)\right) + n^I\left(\frac{N_p + N_{pI}}{2}\right) \times$$

$$\frac{1}{A_o N_{pI} N_{p2}} \sum_{k=0}^{N_{p2}-1} \left[ \sum_{n=kN_{pI}}^{(k+1)N_{pI}} \{a_l(nT_c)(A_o + x_l(nT_c)b_l(nT_c)) \right.$$

$$\cos(\Delta\omega nT_c + \theta_l(nT_c)) + n^I(nT_c)\}]$$

$$\text{Q Channel: } \sqrt{E_{c,l}}\, a_l\left(\frac{N_p + N_{pI}}{2}\right)\left(A_o + x_l\left(\frac{N_p + N_{pI}}{2}\right)b_l\left(\frac{N_p + N_{pI}}{2}\right)\right) \quad (9)$$

$$\sin\left(\frac{\Delta\omega(N_p + N_{pI})}{2} + \theta_l\left(\frac{N_p + N_{pI}}{2}\right)\right) + n^Q\left(\frac{N_p + N_{pI}}{2}\right) \times$$

$$\frac{1}{A_o N_{pI} N_{p2}} \sum_{k=0}^{N_{p2}-1} \left[ \sum_{n=kN_{pI}}^{(k+1)N_{pI}} \{a_l(nT_c)(A_o + x_l(nT_c)b_l(nT_c)) \right.$$

$$\sin(\Delta\omega nT_c + \theta_l(nT_c)) + n^Q(nT_c)\}]$$

As shown in the equations (8) and (9), the phase offset ($\Delta\omega$ term and $\theta_l$ term) and the additional noise ($n_I$ term and $n_Q$ term) according to the observation duration are generated in the process of the channel compensation. From equations (8) and (9), it is possible to obtain an accurate loss of the signal-to-noise ratio (SNR) due to the channel compensation process. Thus, it is possible to calculate an accurate bit error rate (BER) of the RAKE receiver using the maximum ratio combiner (MRC) technique, and analyze the performances in the various channel environments.

To analyze the performance degradation due to the imperfectness, a first statistical value (average value) and a second statistical value (dispersion value) of the receiver are required. These statistical values can be obtained from various random variables (e.g., the Rayleigh fading's amplitude $\alpha$, the Rayleigh fading's phase $\theta$ and the nose v), and to produce the final Eb/lo in the BER formula. In a radio mobile channel, the Rayleigh fading's amplitude and the Rayleigh fading's phase are statistically independent of each other. Further, the Rayleigh random variables are independent of the Gaussian noise. Therefore, the amplitude a, the phase $\theta$ and the nose v are independent random variables.

Accordingly, it is possible to obtain the statistical values using the correlation function and the noise characteristics of the amplitude and phase terms of the Rayleigh fading. The frequency offset $\Delta\omega$ is a constant having a particular value.

If it is assumed that $jN_p \leq n > (j+1)N_p$, where j is an integer, the average values and dispersion values of the channel estimator 100B are given by $$E[Y_l \mid x_l = -1] = -N\sqrt{E_{c,l}}\, \xi_l \quad (10)$$

$$\xi_l = \frac{N_{p2}}{N_p^2} \sum_{n=-\frac{jN_p}{2}}^{\frac{jN_p}{2}+N_{pI}-1} \left\{ \sum_{m=(j-1)N_p}^{jN_p-1} R_{a_l}(|n-m|T_c) R_{\cos\phi_l}(|n-m|T_c) \right. \quad (11)$$

$$\cos(\Delta\omega(n-m)T_c)\}$$

$$E\left[\left\{\sum_{n=jN_p}^{(j+1)N_p+1} v_l(n)\right\}^2\right] = N\sigma_l \times \frac{I_o}{2} \quad (12)$$

$$\sigma_l = \frac{1}{N_p^2}\left\{N_p a_l^2 + 2\sum_{P=1}^{N_p} R_{a_l}(pT_c) R_{\cos\phi_l}(pT_c) \cos(\Delta\omega pT_c) \right. \quad (13)$$

$$(N_p - p)\}(1+\Lambda)\frac{(x_l)^2}{A_0^2} + 2\left[\frac{v_l/2}{E_{c_l} A_0^2}\frac{1}{N_p}\right] + \left[\frac{a_l^2}{N_p^2}\right]$$

where p is an integer, and $\Lambda$ is the number of chips assigned to one bit and is dependent on the observation length $N_p$. That is, when $N < N_p$, $\Lambda = 1$ and, when $N > N_p$, $\Lambda = N/N_p$. The correlation function depends on time delay $|n-m|T_c$, because the Rayleigh fading's amplitude and phase are even functions.

Figure 7:
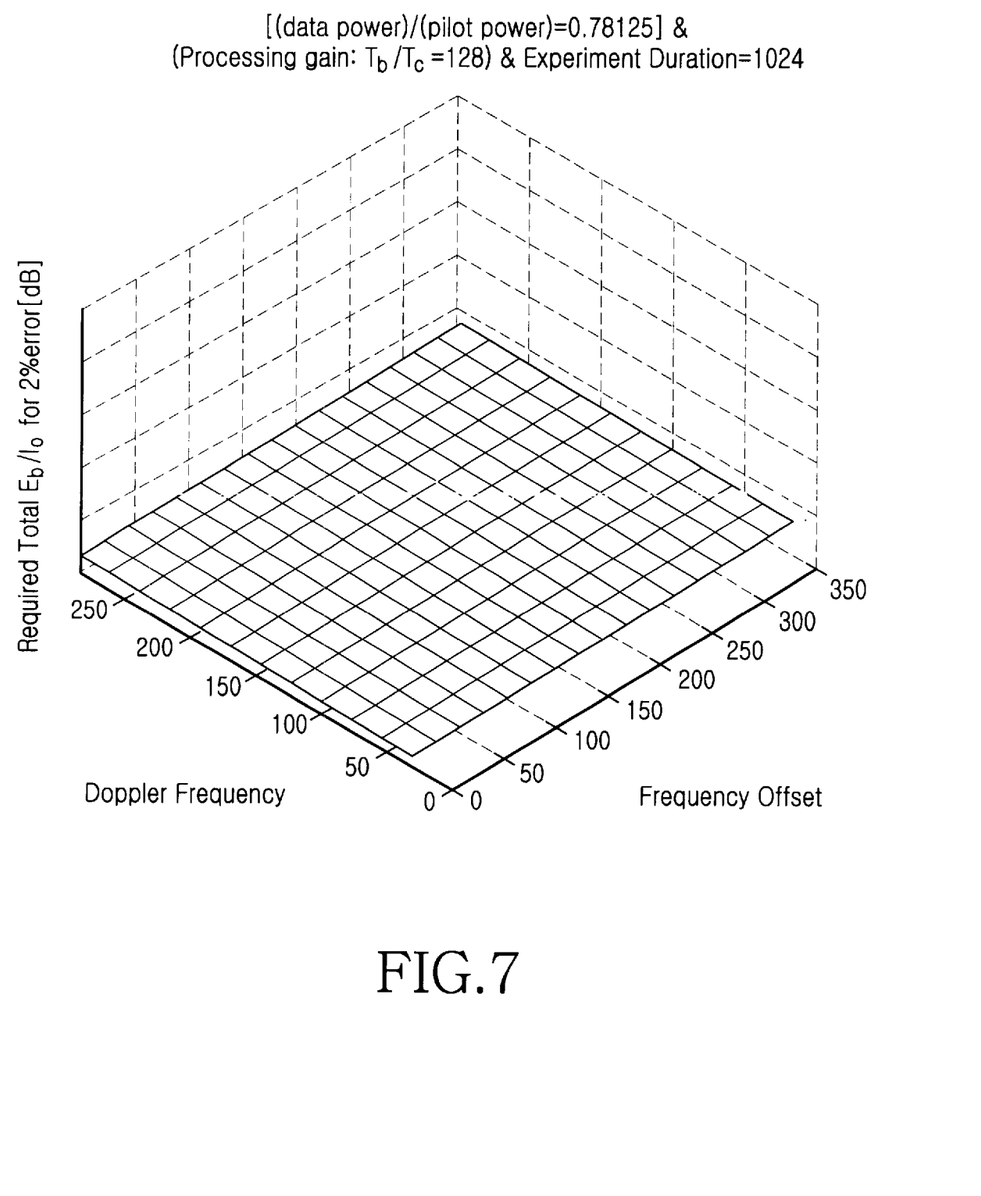
FIG. 7 is a diagram illustrating a BER performance according to a frequency offset and a Doppler frequency when an double integrator structure is used for channel estimation according to a embodiment of the present invention.

FIG. 7 shows the BER performance in relation to the frequency offset and the Doppler frequency when the dual integrator structure is used for channel estimation according to an embodiment of the present invention. In comparison to the single integrator known in the art as shown in FIG. 5, it is possible to obtain a desired receiver performance even though the Eb/lo value according to the frequency offset and the Doppler frequency is not so high.

Figure 8:
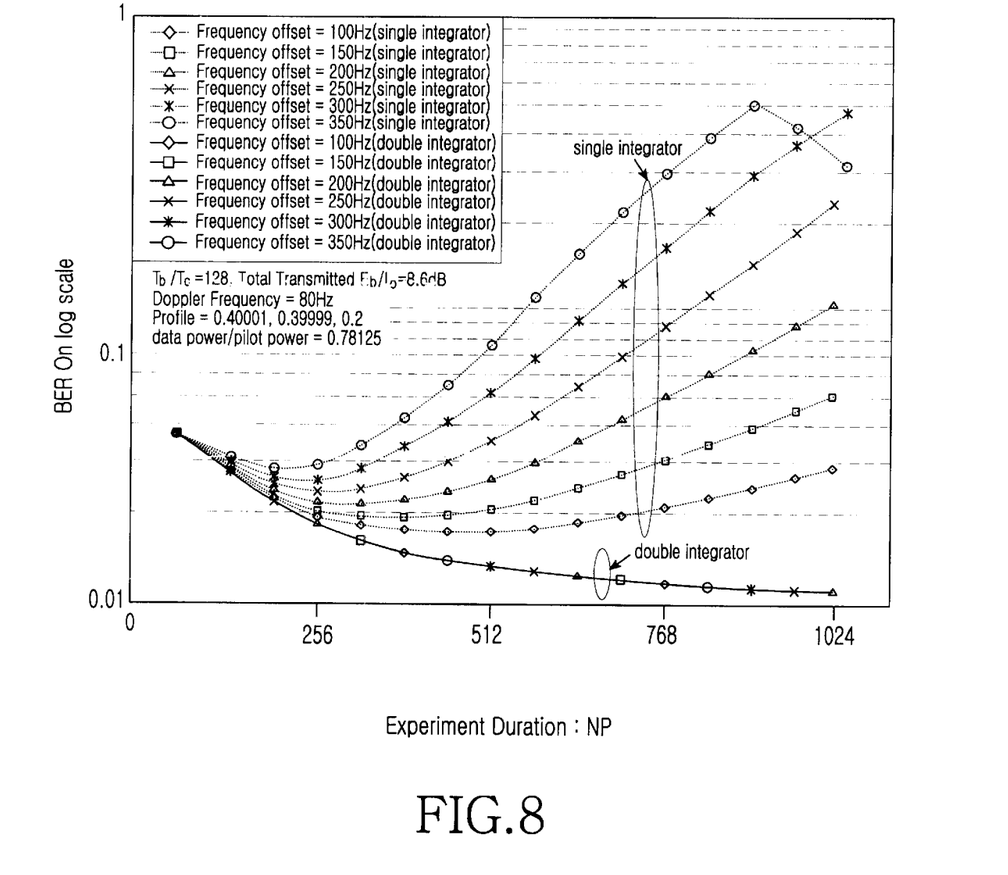
FIG. 8 is diagram illustrating a performance difference between the single integrator structure and the double integrator structure with respect to various residual frequency offsets for the whole integration duration.

FIG. 8 illustrates the performance difference between the conventional single integrator structure and the dual integrator structure with respect to the various residual frequency offsets for the whole integration interval.

In the dual integrator structure according to the present invention, the second integrator has the same estimation value update period dependent on the integration duration (i.e., the observation duration) of the first integrator, so that the channel compensator may not be affected by the channel environment change.

While the invention has been shown and described with reference to a certain preferred embodiment thereof, it will be understood by those skilled in the art that various changes in form and details may be made therein without departing from the spirit and scope of the invention as defined by the variation of multipath characteristics.

What is claimed is:

1. A channel compensator for use in a receiver of a direct sequence code division multiple access (DS-CDMA) communication system for compensating for a phase change and a residual frequency offset of received input signals propagated along different paths and received at said receiver, wherein the system has a predetermined process gain and a corresponding chip rate determined by the processing gain, said channel compensator comprising:

a first integrator for sampling said received input signals at said chip rate, for periodically accumulating said received input signals sampled by said first integrator for a predetermined time, and for multiplying the accumulated received input signals by said predetermined process gain to produce output signal in chip unit;

a shift means having a plurality of shift registers for shifting and assigning said output signal from said first integrator to said shift registers; and, a second integrator for periodically integrating for said predetermined time the output data generated from said plurality of shift registers.

2. The channel compensator as set forth in claim 1, further comprising a delay means for delaying said input signals so that said data output from said first integrator can reach a central register portion of said shift registers.

3. The channel compensator as set forth in claim 2, further comprising a first multiplier for multiplying said delayed input signals by the output of said second integrator to provide multiplied signal for use in said receiver.

4. The channel compensator as set forth in claim 3, wherein said second integrator comprises:

a summer for summing the values of the respective registers of said shift means within said predetermined time, and a second multiplier for multiplying the output value from said summer by a reciprocal number of the total number of said registers in order to reduce dispersion of an estimation value due to noise and to adjust a bit value for detected information from said shift registers.

5. The channel compensator as set forth in claim 1, wherein said predetermined time is set no lower than $1/N_{p2}$, wherein $N_{p2}$ represents the number of said plurality of shift registers.

6. A channel compensator for use in a receiver of a direct sequence code division multiple access (DS-CDMA) communication system for compensating for a phase change and a residual frequency offset of received input signals propagated along different paths and received at said receiver, wherein the system has a predetermined process gain and a corresponding chip rate determined by the processing gain, said channel compensator comprising:

a first integrator for sampling said received input signals at said chip rate, for periodically accumulating said received input signals sampled by said first integrator for a predetermined time, and for multiplying the accumulated received input signals by said predetermined process gain to produce output signal in chip unit;

a shift means having a plurality of shift registers for shifting and assigning said output signal from said first integrator to said shift registers;

a second integrator for periodically integrating for said predetermined time the output data generated from said plurality of shift registers;

a delay means for delaying said input signals so that said data output from said first integrator can reach a central register portion of said shift registers; and, a first multiplier for multiplying said delayed input signals by the output of said second integrator to provide multiplied signal for use in said receiver.

7. The channel compensator as set forth in claim 6, wherein said second integrator comprises:

a summer for summing the values of the respective registers of said shift means within said predetermined time, and a second multiplier for multiplying the output value from said summer by a reciprocal number of the total number of said registers in order to reduce dispersion of an estimation value due to noise and to adjust a bit value for detected information from said shift registers.

8. The channel compensator as set forth in claim 6, wherein said predetermined time is set no lower than $1/N_{p2}$, wherein $N_{p2}$ represents the number of said plurality of shift registers.

9. The channel compensator as set forth in claim 6, wherein the number of said shift registers is odd number.

* * * * *

UNITED STATES PATENT AND TRADEMARK OFFICE
CERTIFICATE OF CORRECTION

PATENT NO.   : 6,577,674 B1
DATED        : June 10, 2003
INVENTOR(S)  : Seok-Jun Ko, Kyung-Ha Lee and Hyung-Jin Choi It is certified that error appears in the above-identified patent and that said Letters Patent is hereby corrected as shown below:

<u>Title page,</u>
Item [73], Assignee, should read:
-- Samsung Electronics Co., Ltd., Suwon (KR) --

Signed and Sealed this

Ninth Day of September, 2003

JAMES E. ROGAN
*Director of the United States Patent and Trademark Office*